US007352689B2

(12) United States Patent
Kang et al.

(10) Patent No.: US 7,352,689 B2
(45) Date of Patent: Apr. 1, 2008

(54) METHOD FOR OPTIMIZING PHASE FACTOR OF SUB-BLOCK SIGNAL IN PARTIAL TRANSMIT SEQUENCE ORTHOGONAL FREQUENCY DIVISION MULTIPLEXING SYSTEM

(75) Inventors: Kun Seok Kang, Daejon (KR); Kwonhue Chol, Daejon (KR); Soo Young Kim, Daejon (KR); Ho Jin Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 964 days.

(21) Appl. No.: 10/298,086

(22) Filed: Nov. 15, 2002

(65) Prior Publication Data

US 2003/0095576 A1    May 22, 2003

(30) Foreign Application Priority Data

Nov. 16, 2001    (KR) ............................. 2001-71271

(51) Int. Cl.
*H04J 11/00* (2006.01)
*H04J 3/06* (2006.01)

(52) U.S. Cl. .................. 370/208; 370/535; 370/518
(58) Field of Classification Search ............ 370/342, 370/208, 335, 210, 209, 211, 206, 345; 375/141, 375/260, 144, 148, 296

See application file for complete search history.

(56) References Cited

U.S. PATENT DOCUMENTS

| 6,470,030 B1* | 10/2002 | Park et al. ............... 370/480 |
| 6,556,557 B1* | 4/2003 | Cimini et al. ............ 370/342 |
| 6,928,084 B2* | 8/2005 | Cimini et al. ............ 370/430 |
| 6,950,389 B2* | 9/2005 | Weerackody ............ 370/210 |

FOREIGN PATENT DOCUMENTS

EP    1 139 625 A2    10/2001

* cited by examiner

*Primary Examiner*—Hanh Nguyen
(74) *Attorney, Agent, or Firm*—Blakely, Sokoloff, Taylor & Zafman, LLP

(57) ABSTRACT

A method for optimizing phase factors in partial transmit sequence orthogonal frequency division multiplexing system. The method includes initializing sub-block signals by applying an initial phase factor to the sub-block signals in all sub-blocks; setting a reference peak value with a peak value of a signal formed by combining the sub-block signals; selecting a phase value that minimizes the peak value of an output signal as the phase factor of each sub-block by applying a next phase value to each sub-block signal as the phase factor, and repeating this with respect to the remaining available phase values.

8 Claims, 3 Drawing Sheets

METHOD FOR OPTIMIZING PHASE FACTOR OF SUB-BLOCK SIGNAL IN PARTIAL TRANSMIT SEQUENCE ORTHOGONAL FREQUENCY DIVISION MULTIPLEXING SYSTEM

FIELD OF THE INVENTION

The present invention relates to a method for optimizing a phase factor of a sub-block signal in a partial transmit sequence orthogonal frequency division multiplexing system and a computer-readable recording medium for recording a program that implements the method; and, more particularly, to a method for optimizing a phase factor by applying each phase value to the sub-block signals sequentially to obtain a phase value that minimizes the peak power and selecting the obtained phase value as a phase factor of a sub-block in a partial transmit sequence orthogonal frequency division multiplexing system, and a computer-readable recording medium for recording a program that implements the method.

DESCRIPTION OF RELATED ART

This invention particularly describes a phase factor optimizing method which is applied to partial transmit sequence orthogonal frequency division multiplexing system. Here, in the partial transmit sequence, the entire sub-carrier block is divided into several disjoint carrier sub-block that are not overlapped with each other, the peak power can be reduced by optimizing the phase factor of each sub-block signal. A signal vector (X) assigned to each sub-carrier in a frequency domain is divided into L sub-blocks, which can be expressed as Equation 1 below:

$$X = \sum_{l=1}^{L} X^{(l)} \qquad \text{Eq. 1}$$

where L denotes the number of sub-blocks, and $X^{(l)}$ denotes each sub-block signal in, frequency domain. Generally, orthogonal frequency division multiplexing is performed using discrete Fourier transform. The time domain sub-block signal (x) is obtained by a number of linear transformations IDFT. There is no difference between phase shift of sub-block signal in frequency domain and phase shift of sub-block signal in time domain. Therefore, the optimization of phase factor is performed in time domain, which can be expressed as Equation 2 below:

$$x = \sum_{l=1}^{L} IDFT\{\tilde{b}^{(l)} \cdot X^{(L)}\} = \sum_{l=1}^{L} \tilde{b}^{(l)} \cdot IDFT\{X^{(l)}\} = \sum_{l=1}^{L} \tilde{b}^{(l)} \cdot x^{(l)} \qquad \text{Eq. 2}$$

where $\tilde{b}^{(l)}$ denotes the optimized phase factor applied to the $1^{th}$ sub-block, i.e., a phase factor which minimizes the peak value, $X^{(l)}$ being the $1^{th}$ sub-block, $x^{(l)}$ being a discrete inverse Fourier transformed signal, IDFT being a discrete inverse Fourier transform.

In the conventional partial transmit sequence, all the available combinations of phase values are searched for optimizing the phase factors. Accordingly, when the number of available phase values is R and the number of sub-blocks is L, the number of available combinations becomes $R^{(L-1)}$.

A conventional partial, transmit sequence orthogonal frequency division multiplexing system is disclosed in U.S. Pat. No. 6,125,103. Its technological point is to divide the entire sub-carrier into several disjoint carrier sub-blocks, modulates each sub-block signal independently, and optimizes a phase factor to minimize peak to average power ratio. This method, however, has a major drawback that the computational complexity is increased highly, because all possible combinations of phase values have to be searched so as to adjust the phase factor to each of the sub-block signals.

Meanwhile, a conventional method for reducing the complexity in the phase factor optimization process is disclosed in 'IEEE Communications Letters Vol. 4, No. 3', pp.86-88. Its technological point is to optimize a phase factor one by one sub-block signal in turn. This method, however, also has a problem that the peak to average power ratio is not reduced sufficiently.

SUMMARY OF THE INVENTION

It is, therefore, an object of the present invention to provide a method for optimizing a phase factor of each sub-block signal, which applies each phase value to sub-block signal sequentially. The present invention has less complexity in the phase factor optimizing process because the number of phase value combinations being searched is extremely reduced compared to conventional methods, and reduces the peak to average power ratio, and a computer-readable recording medium for recording a program that, implements the method In accordance with an aspect of the present invention, there is provided a method for optimizing a phase factor for each sub-block signal inn a partial transmit sequence orthogonal frequency division multiplexing system, comprising the steps of: a) initializing sub-block signals by applying a first phase factor to the sub-block signals in all sub-blocks; b) setting a reference peak value with a peak value of a signal formed by combining the sub-block signals whose phase factors are selected in the step a); c) selecting a phase value that minimizes a peak value of an output signal as the phase factor of each sub-block by applying the next phase value to each sub-block signal as the phase factor; and d) repeating the step c) with respect to the remaining available phase values.

In accordance with another aspect of the present invention, there is provided a computer-readable recording medium storing instructions for executing a method optimizing a phase factor for each sub-block signal in a partial transmit sequence orthogonal frequency division multiplexing system, the method comprising the steps of: a) initializing sub-block signals by applying a first phase factor to the sub-block signals in all sub-blocks; b) setting a reference peak value with a peak value of a signal formed by combining the sub-block signals whose phase factors are selected in the step a); c) selecting a phase value that minimizes a peak value of an output signal as the phase factor of each sub-block by applying the next phase value to each sub-block signal as the phase factor; and d) repeating the step c) with respect to the remaining available phase values.

BRIEF DESCRIPTION OF THE DRAWINGS

The above and other objects and-features of the present invention will become apparent front the following description of the preferred embodiments, given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
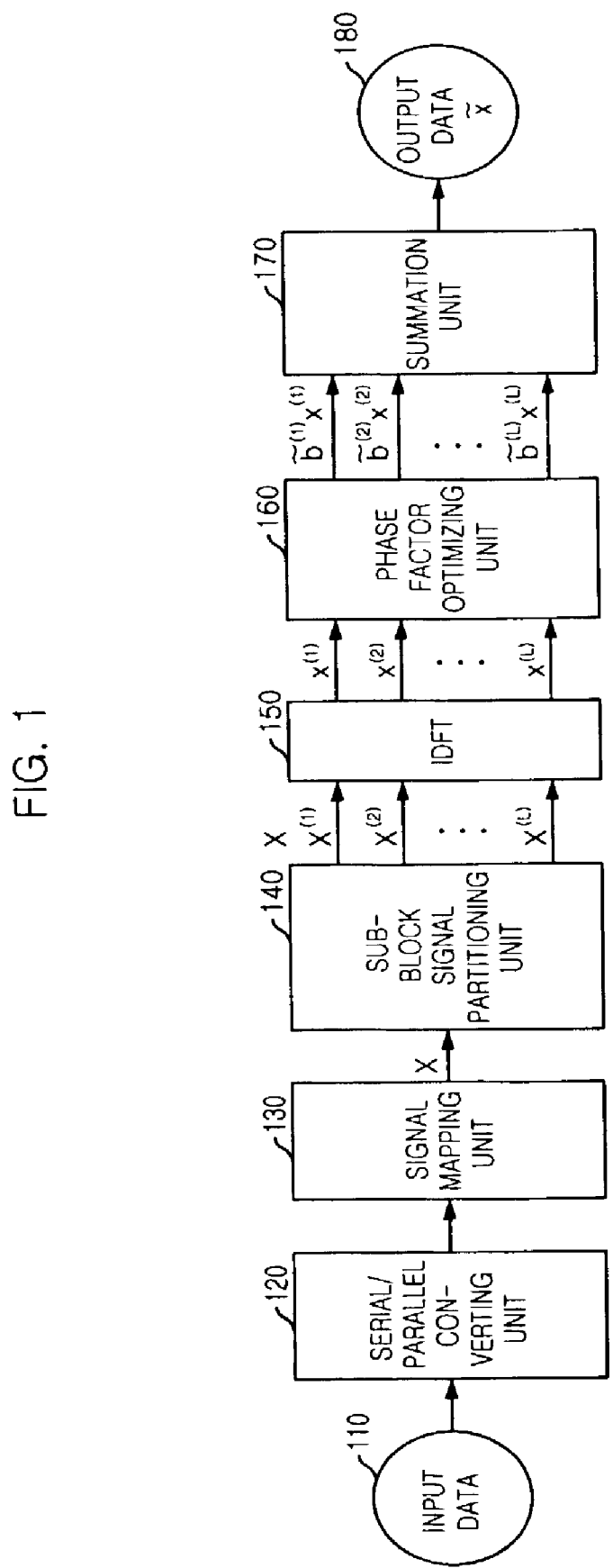
FIG. 1 shows a block diagram of a partial transmit sequence orthogonal frequency division multiplexing system.

FIG. 1 shows a block diagram of a partial transmit sequence orthogonal frequency division multiplexing system.

The transmission device includes a serial/parallel converting unit 120, a signal mapping unit 130, a sub-block partitioning unit 140, a inverse discrete Fourier transform (IDFT) unit 150, a phase factor optimizing unit 160 and a summation unit 170.

The serial/parallel converting unit 120 converts an input data sequence 110 into parallel data sequence. Then, the signal mapping unit 130 generates the complex signal according to the constellation of corresponding modulation scheme (M-ary PSK or QAM) with the parallel data converted in serial/parallel converting unit 120. The sub-block partitioning unit 140 divides the frequency-domain signal, generated by the signal mapping unit 130, into sub-block and assigns them to each sub-block.

The IDFT unit 150 transforms the frequency domain sub-block signals into a time domain sub-block signals. The phase factor optimizing unit 160 optimizes the phase factor and reduces the peak value by applying an appropriate phase factor to each of the time domain sub-block signals. The summation unit 170 sums up the sub-blocks with an optimized phase factor in the phase factor optimizing unit 160 and generates the output signal.

The difference between partial transmit sequence orthogonal frequency dividing multiplexing and general orthogonal frequency dividing multiplexing is that modulated symbols are generated by dividing d signal in the sub-block partitioning unit 140 and modulating them in the IDFT 150, and the peak to average power ratio is reduced by optimizing the phase factors in the partial transmit sequence orthogonal frequency dividing multiplexing system. The method of the present invention is applied to the phase factor optimizing unit 160. This method can reduce the complexity in the phase factor optimizing process, compared to the conventional partial transmit sequence.

As described above, the conventional phase factor optimizing method requires $R^{(L-1)}$ peak value computation and comparison process to perform the phase factor optimization, but the method of the present invention reduces the number of the peak value computation and comparison process to $(R-1)*L$.

Figure 2:
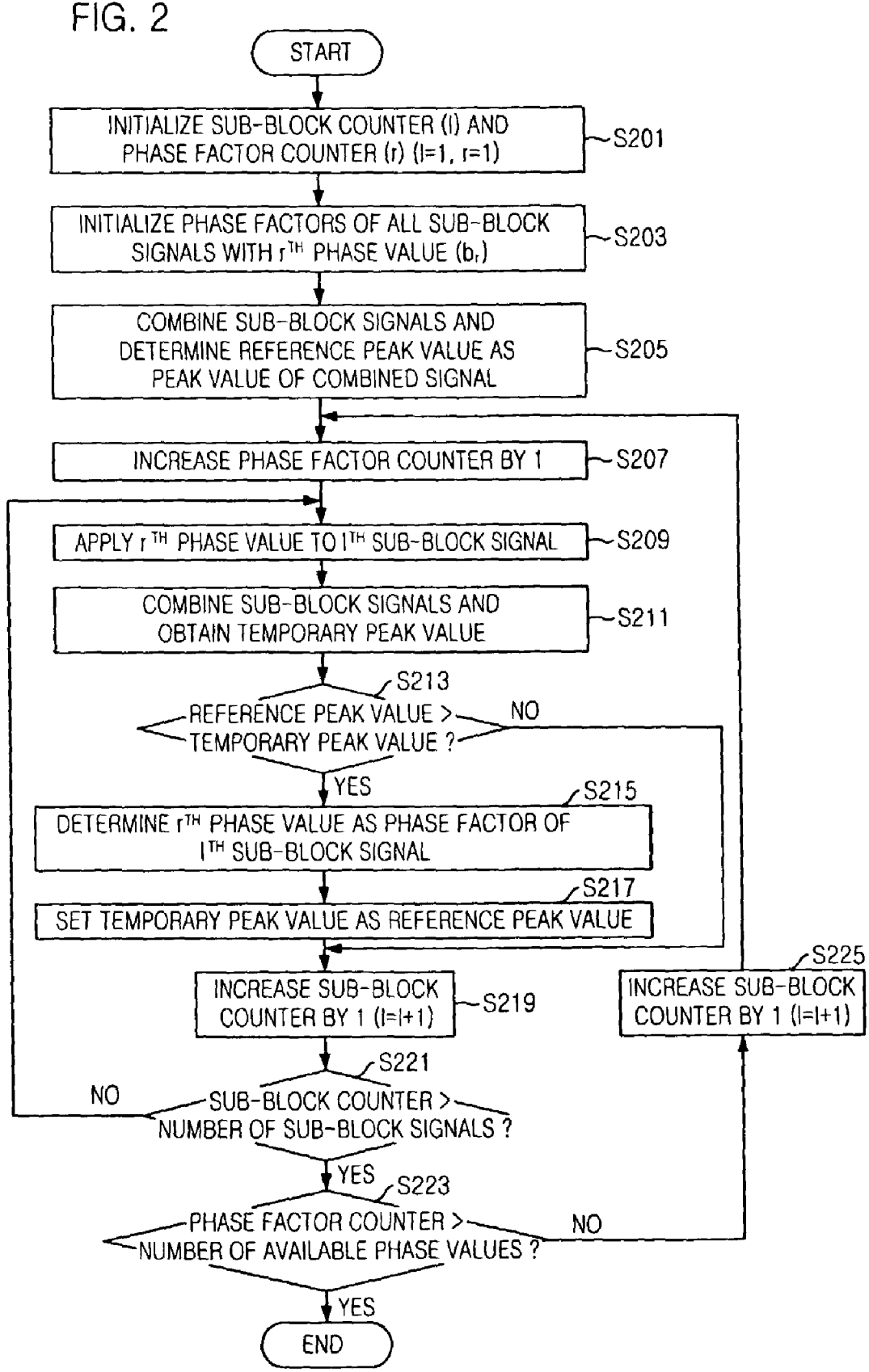
FIG. 2 is a flow chart illustrating a method for optimizing a phase factor of a sub-block signal in the partial transmit sequence orthogonal frequency division multiplexing system in accordance with the present invention.

FIG. 2 shows a flow chart illustrating a method for optimizing a phase factor of a sub-block signal in the partial transmit sequence orthogonal frequency division multiplexing system in accordance with the present invention.

First, at step S201, a sub-block counter and a phase factor counter are initialized to 1. Then, at step S203, the phase factors of all sub-block signals are initialized with the phase value indicated by the phase factor counter. The process of applying and initializing a phase factor is expressed as Equation 3 shown below. Equation 3 can be applied to the processes of initializing the phase factor for each sub-block signal and optimizing a phase factor, which will be described later on.

$$x'^{(l)} = b_r^{(l)} \cdot x^{(l)} \qquad \text{eq. 3}$$

where $x^{(l)}$ is a time domain sub-block signal which is the -result of discrete-Fourier-transform for the $l^{th}$ frequency domain sub-block signal ($X^{(l)}$), $b_r^{(l)}$ being the $r^{th}$ phase value (i.e., a complex number with constant amplitude, $|b_r^{(l)}|=1$) applied to the $l^{th}$ sub-block, and $x'^{(l)}$ being the $l^{th}$ time domain sub-block signal to which phase factor is applied.

The phase values used here are obtained by evenly dividing the entire phase of $2\pi$ by the number of available phase values. An exemplary order of applicable phase values is determined as follow.

Figure 3:
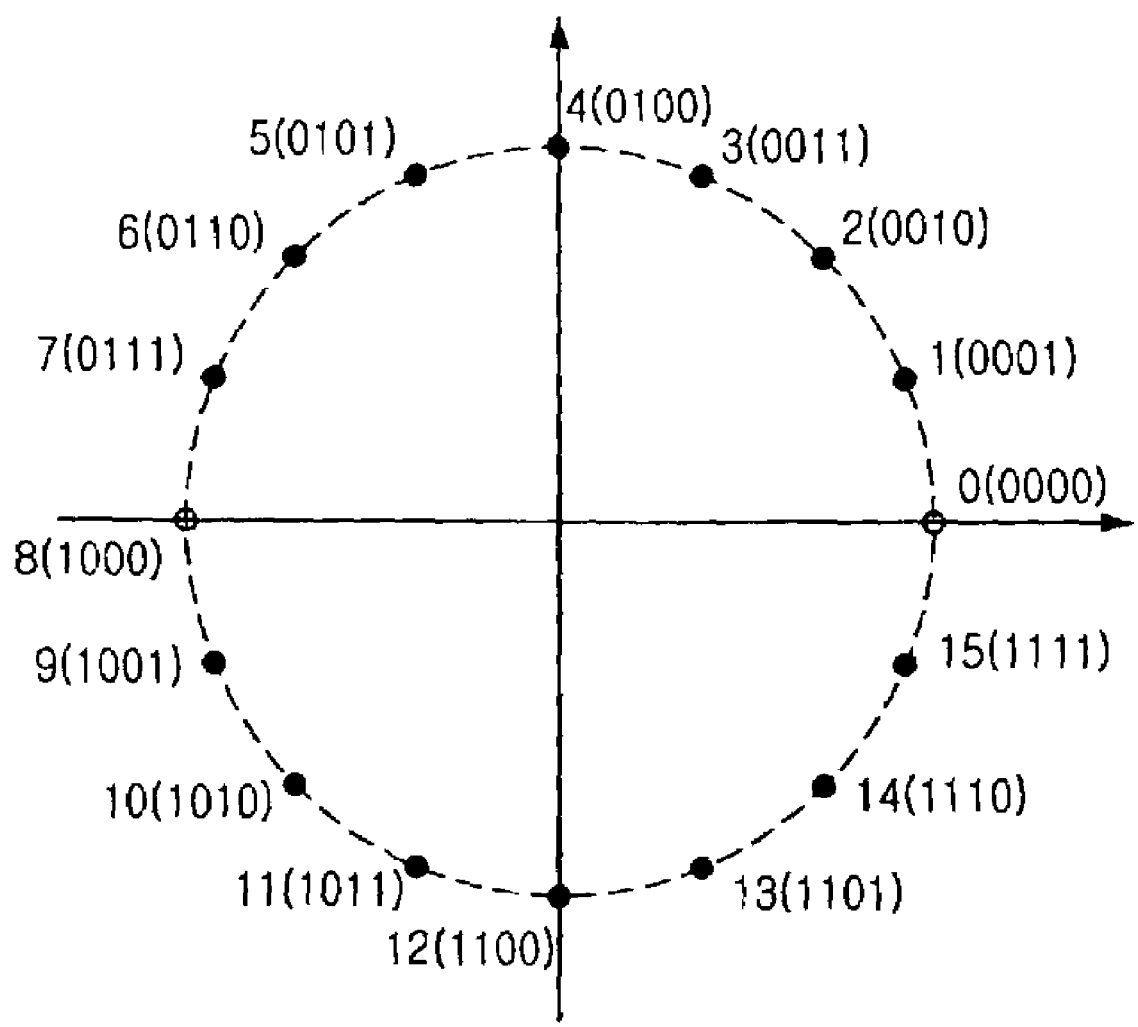
FIG. 3 shows a diagram, describing a phase value order of phase value applying to the sub-block signal for phase factor optimizing method in the partial transmit sequence orthogonal frequency division multiplexing system in accordance with present invention.

When the number of phase values is R, $2\pi$ is equally divided by the number of phase values, therefore, the interval between adjacent phase values is $2\pi/R$. These phase values are numbered from 0 to R with binary notation starting from 0 radian in counter clockwise direction. This is shown in FIG. 3, in which the number of available phase value is 16. Here, the applying order of phase value can is obtained by performing bit reversion. In other words, if the phase value ABCD, the bit reversion number is DCBA, When the first phase value is 0, $1^{st}$ phase value: 0000(0)→since bit reversion number is 0000, it becomes a phase value No.0 (0);

$2^{nd}$ phase value: 0001(1)→since bit reversion number is 1000, it becomes a phase value No.8 ($\pi$);

$3^{rd}$ phase value: 0010(2)→since bit reversion number is 0100, it becomes a phase value No.4 ($\pi/2$);

$4^{th}$ phase value: 0011(3)→since bit reversion number is 1100, it becomes a phase value No.12 ($3\pi/2$);

$5^{th}$ phase value: 0100(4)→since bit reversion number is 0010, it becomes a phase value No.2 ($\pi/4$);

$6^{th}$ phase value: 0101(5)→since bit reversion number is 1010, it becomes a phase value No.10 ($5\pi/4$);

$7^{th}$ phase value: 0110(6)→since bit reversion number is 0110, it becomes a phase value No.6 ($3\pi/4$); and $8^{th}$ application phase value; 0111(7)→since bit reversion number is 1110, it becomes a phase value No.14 ($7\pi/4$).

Repeating the above process, the order of 16-phase value can be determined. For example, when there are 8 phase values, the available phase values are $\{0, \pi/4, \pi/2, 3\pi/4, \pi, 5\pi/4, 3\pi/2, 7\pi/4\}$, and the phase values are applied to sub-block signals in order of $\{0, \pi, \pi/2, 3\pi/2, \pi/4, 5\pi/4, 3\pi/4, 7\pi/4\}$.

Subsequently, at step S205, the phase factor optimizing unit 160 combines the time domain sub-block signal to which the phase factors are applied and obtain the peak value. This peak value is determined as a reference peak value. Here, the peak value is calculated from Equation 4.

$$P = \max_{1 \leq i < N} \left\{ \left| \sum_{l=1}^{L} x'^{(l)} \right|^2 \right\} \qquad \text{Eq. 4}$$

where P denotes a peak value, N being the number of the entire sub-carrier, and $x'^{(l)}$ being the $l^{th}$ sub-block signal with a corresponding phase factor.

At step S207, since the first phase value is already used to compute the reference peak value, the phase factor counter is increased by 1 and it indicates the second phase value.

At step S209, a phase value corresponding to the phase factor counter, i.e., the $r^{th}$ phase value, is applied to the $l^{th}$ sub-block signal. At step S211, the phase factor optimizing unit 160 combines the sub-block signals and obtain the peak value in the same, way at the step 203. This peak value is determined as a temporary peak value. At step S213, the temporary peak value is compared with the reference peak value.

Subsequently, at step S215, if the temporary peak value is smaller than the reference peak value, the $r^{th}$ phase value is applied to the $l^{th}$ sub-block signal as a phase factor. At step S217, the reference peak value is replaced with a temporary peak value, and at step S219, the sub-block counter is increased by 1. Here, if the temporary peak value is larger than the reference peak value, only the sub-block counter is increased by 1, and the phase factor of the $l^{th}$ sub-block signal is maintained.

The computation of the temporary peak value can be simplified by subtracting the, sub-block signal having the previous phase factor from the previously combined signal and adding the sub-block signal having a new phase factor to the previously combined signal, only for the sub-block signal that the phase factor is changed.

Subsequently, at step S221, the sub-block counter and the entire number of sub-block signals are compared. Here, it is checked whether the process of comparing peak values with the second phase factor is performed on all the sub-block signals. That is, when the sub-block counter is smaller than the number of sub-block signals, it means that the processes S209 to S219 are not carried out yet for the entire sub-block signals. Therefore, the processes are performed repeatedly for the sub-block signal indicated by the corresponding sub-block counter. If the sub-block counter is the same as the number of sub-block signal, it means that the processes S209 to S219 are completed for the entire sub-block signals with the above phase value. And then, at step S223, it is determined whether the entire phase values are utilized to optimize the phase factor. Otherwise, at step S225, the sub-block counter is initialized to 1, and then the processes S207 to S221 for the next phase value are repeated.

When the phase factor counter becomes the same as the number of all the available phase values, the process for minimizing the peak value for all phase factors is terminated. Here, the phase factor of each sub-block signal is determined to the phase value corresponding to the phase factor, finally.

The method of the present invention can be embodied as a program and recorded in a computer-readable recording medium, such as CD-ROM, RAM, ROM, floppy disks, hard disks, optical-magnetic disks, and the like.

As described above, the method of the present invention reduces the complexity of the phase factor optimizing process by the sequential process of phase values, and reduces the peak to average power ratio effectively in a partial transmit sequence orthogonal frequency division multiplexing system.

While the present invention has been described with respect to certain preferred embodiments, it will be apparent to those skilled in the art that various changes and modifications may be made without departing from the scope of the invention as defined in the following claims.

What is claimed is:

1. A method for optimizing a phase factor for each sub-block signal in a partial transmit sequence orthogonal frequency division multiplexing system, comprising the steps of:
    a) initializing sub-block signals by applying an initial phase factor to the sub-block signals in all sub-blocks;
    b) setting a reference peak value with a peak value of a signal formed by combining the sub-block signals whose phase factors are selected in the step a);
    c) selecting a phase value that minimizes the peak value of an output signal as the phase factor of each sub-block by applying a next phase value to each sub-block signal as the phase factor; and
    d) repeating the step c) with respect to the remaining available phase values, wherein in the step c),
    performing bit reversion of a binary number and generating a bit-reversion number; and
    setting the phase value corresponding to the bit-reversion number as a phase factor in accordance with the order of the bit-reversion number.

2. The method as recited in claim 1, wherein in the step c), the peak value of a signal formed by combining the sub-block signals having the next phase value is compared with the reference peak value to determine the smaller peak value as a new reference peak value, and the phase value that minimizes the peak value is determined as a phase factor of the sub-block signal.

3. The method as recited in claim 2, wherein the step c) includes the steps of:
    c1) applying a phase factor corresponding to the $r^{th}$ phase value to the $l^{th}$ sub-block signal;
    c2) determining the peak value of the output signal to which the phase factor is applied in the step c1) as a temporary peak value;
    c3) comparing the temporary peak value with the reference peak value;
    c4) if the reference peak value is larger than the temporary peak value, determining the $r^{th}$ phase value as the phase factor of the $l^{th}$ sub-block signal and the temporary peak value as the reference peak value; and
    c5) if the reference peak value is smaller than the temporary peak value, maintaining the phase factor of the $l^{th}$ sub-block signal.

4. The method as recited in claim 2, wherein in the step c), a temporary peak value of a signal is obtained by subtracting the sub-block signal having the previous phase factor from the previously combined signal and adding the sub-block signal having a new phase factor to the previously combined signal, only for the sub-block signal that the phase factor is changed.

5. The method as recited in claim 1, wherein in the step c), in determining the phase factor, the binary number is determined by performing the steps of:
    dividing $2\pi$ by a first number, the first number being the number of available phase values and generates the first number of points; and
    numbering each point with the binary number from 0 and to the number of the available phase values sequentially.

6. A computer-readable recording medium containing instructions for executing a method for optimizing a phase factor for each sub-block signal in a partial transmit sequence orthogonal frequency division multiplexing system, that, when executed, cause a machine to:
    (a) initialize sub-block signals by applying an initial phase factor to the sub-block signals in all sub-blocks;

(b) set a reference peak value with a peak value of a signal formed by combining the sub-block signals whose phase factors are selected in the step (a);

(c) select a phase value that minimizes the peak value of an output signal as the phase factor of each sub-block by applying a next phase value to each sub-block signal as the phase factor; and (d) repeat the step (e) with respect to the remaining available phase values, wherein in the step (c), the phase factor is determined by further causing the machine to:

perform bit reversion of a binary number and generating a bit-reversion number; and set the phase value corresponding to the bit-reversion number as a phase factor in accordance with the order of the bit-reversion number.

7. The computer-readable recording medium of claim 6, wherein in the determining the phase factor, the binary number is determined by further causing the machine to:

divide $2\pi$ by a first number, the first number being the number of available phase values and generates the first number of points; and number each point with a binary number from 0 and to the number of the available phase values sequentially.

8. A method for optimizing a phase factor for each sub-block signal in a partial transmit sequence orthogonal frequency division multiplexing system, comprising the steps of:

a) initializing sub-block signals by applying an initial phase factor to the sub-block signals in all sub-blocks;

b) setting a reference peak value with a peak value of a signal formed by combining the sub-block signals whose phase factors are selected in the step a);

c) selecting a phase value that minimizes the peak value of an output signal as the phase factor of each sub-block by applying a next phase value to each sub-block signal as the phase factor; and d) repeating the step c) with respect to the remaining available phase values, wherein in the step c), a temporary peak value of a signal is obtained by subtracting the sub-block signal having the previous phase factor from the previously combined signal and adding the sub-block signal having a new phase factor to the previously combined signal, only for the sub-block signal that the phase factor is changed.

* * * * *